(12) United States Patent
Getker et al.

(10) Patent No.: US 8,018,349 B1
(45) Date of Patent: Sep. 13, 2011

(54) DETECTING AN INLINE POWER SHUTOFF FAILURE

(75) Inventors: James Getker, Bradenton, FL (US); Philip Van Atta, Bradenton, FL (US)

(73) Assignee: Cisco Technology, Inc., San Jose, CA (US)

(*) Notice: Subject to any disclaimer, the term of this patent is extended or adjusted under 35 U.S.C. 154(b) by 315 days.

(21) Appl. No.: 12/431,935

(22) Filed: Apr. 29, 2009

(51) Int. Cl.
G08B 21/00 (2006.01)

(52) U.S. Cl. ............... 340/660; 714/14; 713/300

(58) Field of Classification Search .......... 340/660; 714/4.1, 14; 713/300; 370/216, 241, 910
See application file for complete search history.

(56) References Cited

U.S. PATENT DOCUMENTS

| | | | |
|---|---|---|---|
| 7,340,325 B2 | 3/2008 | Sousa et al. | |
| 7,373,532 B2 | 5/2008 | Schindler | |
| 7,424,348 B2 | 9/2008 | Claseman | |
| 7,536,566 B2 | 5/2009 | Hemmah et al. | |
| 7,549,067 B2 | 6/2009 | Tolliver | |
| 7,586,840 B2 | 9/2009 | Karam | |
| 7,620,846 B2 * | 11/2009 | Biederman et al. | 714/14 |
| 7,693,076 B2 * | 4/2010 | Karam | 370/241 |
| 7,698,580 B2 * | 4/2010 | Schindler et al. | 713/300 |
| 7,823,026 B2 * | 10/2010 | Karam et al. | 714/43 |
| 7,836,336 B2 * | 11/2010 | Biederman et al. | 714/14 |

* cited by examiner

*Primary Examiner* — John A Tweel, Jr.
(74) *Attorney, Agent, or Firm* — BainwoodHuang

(57) ABSTRACT

Power control circuitry (i) applies an inline power signal from a power source to first and second terminals when a control signal delivered to the power control circuitry has an inline-power-ON value and (ii) shuts off the inline power signal from the power source to the first and second terminals when the control signal delivered to the power control circuitry has an inline-power-OFF value. Detection of an inline power shutoff failure includes obtaining a measurement signal from sensing circuitry while the control signal delivered to the power control circuitry has the inline-power-OFF value, and generating a result signal based on the measurement signal. The result signal indicates whether the power control circuitry is applying the inline power signal from the power source to the first and second terminals while the control signal delivered to the power control circuitry has the inline-power-OFF value due to an inline power shutoff failure.

20 Claims, 4 Drawing Sheets

DETECTING AN INLINE POWER SHUTOFF FAILURE

BACKGROUND

Power over Ethernet (PoE) refers to delivery of power from power sourcing equipment (PSE) to powered devices (PDs) through Ethernet cabling. IEEE 802.3af is a standard which provides specific implementation details for such power delivery (e.g., see IEEE Std 802.3af-2003).

Examples of PSE include network switches, routers, hubs and midspans. Examples of PDs include wireless access points, IP phones, and IP cameras.

In general, the PSE carries out a discovery process through each network port to determine whether there is a remote device connected to that network port. If a remote device is connected to that network port, the PSE determines whether the PSE should deliver inline power to the remote device through that network port as part of the discovery routine. If the PSE decides to purposefully deliver inline power to the remote device, an inline power controller of the PSE turns on inline power to the network port by delivering an inline power signal from a power supply of the PSE to the network port. After the inline power controller turns on inline power to the network port, the inline power controller monitors an electrical characteristic at the network port to confirm the presence of an inline power signal, and reports an error if no inline power signal is detected while inline power is turned on.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Figure 1:
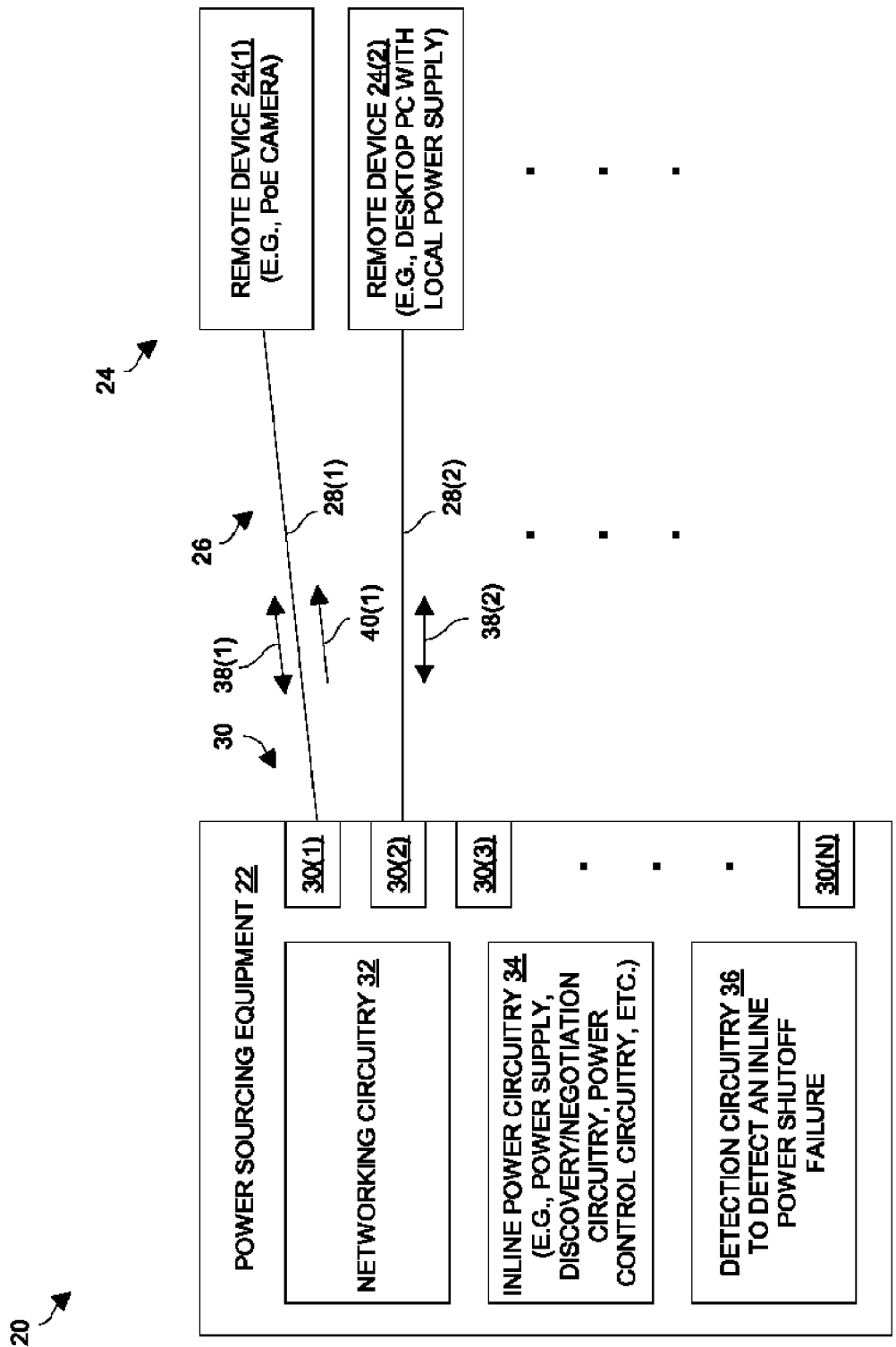
FIG. 1 is a block diagram of an electronic system having power sourcing equipment (PSE) which is equipped to detect of an inline power shutoff failure.

Unfortunately, there are deficiencies to the above-described conventional PSE. For example, in the conventional PSE, the inline power controller monitors the network port only when the inline power controller within the conventional PSE purposefully directs the power supply of the conventional PSE to deliver the inline power signal to the network port. If the inline power controller within the conventional PSE purposefully directs the power supply of the conventional PSE to turn off delivery of the inline power signal to the network port, the conventional PSE does not monitor the network port for the presence of an inline power signal at the network port. Accordingly, if the inline power controller has directed the power supply of the conventional PSE to turn off delivery of inline power through the network port but the power supply has malfunctioned (e.g., a failure of electronic switches cutting off the inline power signal from the power supply to the network port), the malfunction will go unreported. As a result, any remote device connected to the network port runs the risk of being damaged by the uncontrolled delivery of inline power through the network port.

In contrast to the above-described conventional PSE, improved techniques involve detection of an inline power shutoff failure. Such detection involves monitoring network ports when inline power is turned off to the network ports, e.g., monitoring network ports at all times regardless of whether inline power is turned off or on. If the inline power signal is detected at a network port when inline power should be turned off, notification is capable of being provided to a user so that the user can take appropriate steps to disconnect any remote device connected to the network port and thus prevent damage to the remote device. Additionally, if the inline power signal is detected at the network port when inline power should be turned off, an automated safety operation is capable of being carried out (e.g., deactivation of a circuit board on which the network port resides) to prevent damage to the remote device.

In one embodiment, power control circuitry (i) applies an inline power signal from a power source to first and second terminals (e.g., center taps of PoE transformers) when a control signal delivered to the power control circuitry has an inline-power-ON value and (ii) shuts off the inline power signal from the power source to the first and second terminals when the control signal delivered to the power control circuitry has an inline-power-OFF value. Detection of an inline power shutoff failure includes obtaining a measurement signal from sensing circuitry while the control signal delivered to the power control circuitry has the inline-power-OFF value, and generating a result signal based on the measurement signal. The result signal indicates whether the power control circuitry is applying the inline power signal from the power source to the first and second terminals while the control signal delivered to the power control circuitry has the inline-power-OFF value due to an inline power shutoff failure.

Description of Example Embodiments

FIG. 1 shows an electronic system 20 which utilizes detection circuitry to detect an inline power shutoff failure. The electronic system 20 includes power sourcing equipment (PSE) 22, a set of remote devices 24(1), 24(2), . . . (collectively, remote devices 24), and a communications medium 26 (e.g., Ethernet cabling 28(1), 28(2), . . . ). The PSE 22 includes a set of network ports 30(1), 30(2), 30(3), . . . , 30(N) (collectively, network ports 30), networking circuitry 32, inline power circuitry 34, and detection circuitry 36.

The PSE 22 is capable of exchanging data with each remote device 24 through the communications medium 28. Additionally, the PSE 22 is capable of delivering inline power to a remote device 24 through the communications medium 26 if that remote device 24 is a powered device (PD).

By way of example only, the remote device 24(1) is a PD such as a Power over Ethernet (PoE) camera. In this situation, the Ethernet cabling 28(1) conveys data signals 38(1) between the PSE 22 and the remote device 24(1), as well as an inline power signal 40(1) from the PSE 22 and the remote device 24(1).

Also by way of example, the remote device 24(2) is a device which only takes a local power signal such as a desktop computer with a local power supply. In this situation, the Ethernet cabling 28(1) conveys only data signals 38(2) between the PSE 22 and the remote device 24(2).

During operation, the inline power circuitry 34 of the PSE 22 periodically carries out a discovery process at each network port 30. When the inline power circuitry 34 discovers a PD ready to receive inline power (e.g., remote device 24(1)) through a particular network port 30 (e.g., port 30(1)), the inline power circuitry 34 supplies inline power (e.g., inline power signal 40(1)) to the PD through the network port 30 thus enabling the PD to operate without a local power supply. For example, the networking circuitry 32 of the PSE 22 then able to exchange data with the PD through that network port 30.

If the inline power circuitry 34 does not discover a PD connected to a particular network port 30, the inline power circuitry 34 turns off inline power to that port 30. For example, the inline power circuitry 34 purposefully does not provide an inline power signal to the remote device 24(2) through the network port 30(2) since the remote device 24(2) did not request inline power. Rather, the remote device 24(2) is able to operate using a local power supply, and the networking circuitry 32 is able to exchange data with the remote device 24(2) through the network port 30(2).

It should be understood that the detection circuitry 36 of the PSE 22 is constructed and arranged to detect inline power shutoff failures during PSE operation. For example, while inline power to the network port 30(2) is turned off, the detection circuitry 36 monitors electrical characteristics of the network port 30(2) for inadvertent delivery of an inline power signal to a network port 30. Specifically, in the event that the detection circuitry 36 detects the presence of an inline power signal at the network port 30(2), the detection circuitry 36 takes action to prevent damage to the remote device 24(2). In some arrangements, the detection circuitry 36 notifies a user (e.g., by sending an email or lighting an LED) thus enabling the user to physically intervene (e.g., disconnect the remote device 24(2) from the port 30(2), repair the PSE 22, etc.). In some arrangements, the detection circuitry 36 automatically deactivates a circuit board of the PSE 22 (e.g., deactivates a particular line card of a set of line cards in the context of a high density switch or routing device). Further details will now be provided with reference to FIG. 2.

Figure 2:
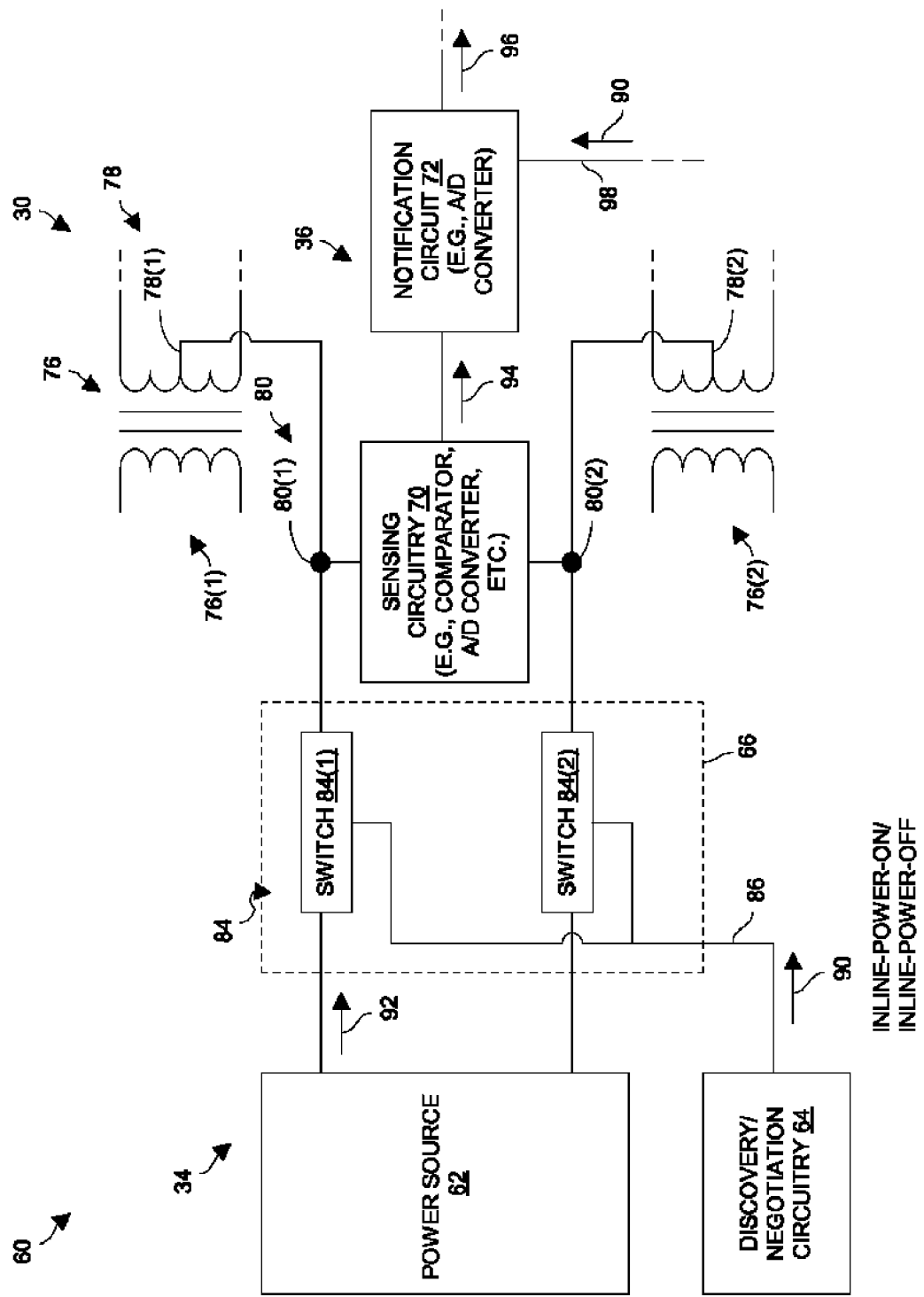
FIG. 2 is a block diagram of particular details of the PSE of FIG. 1.

FIG. 2 shows a portion 60 of the PSE 22 which is involved in detecting an inline power shutoff failure at a particular network port 30. The portion 60 includes a power source 62, discovery/negotiation circuitry 64 and power control circuitry 66 which form part of the inline power circuitry 34 (also see FIG. 1). Additionally, the portion 60 includes sensing circuitry 70 and a notification circuit 72 which form part of the detection circuitry 36 (FIG. 1). Furthermore, the portion 60 includes transformers 76(1), 76(2) (collectively, transformers 76) which form part of a network port 30 (FIG. 1).

Each transformer 76 has a center tap 78 which is electrically accessible at a terminal (or node) 80. In particular, the transformer 76(1) has center tap 78(1) which is accessible at terminal 80(1). Similarly, the transformer 76(2) has center tap 78(2) which is accessible at terminal 80(2).

As shown in FIG. 2, the power control circuitry 66 includes a set of switches (e.g., relays, MOSFETs, etc.) 84 which selectively connect the power source 62 to, and disconnect the power source 62 from the terminals 80. In particular, switch 84(1) is disposed between the power source 62 and the terminal 80(1). Similarly, switch 84(2) is disposed between the power source 62 and the terminal 80(2). The control inputs 86 to the switches 84 are under direction of the discovery/negotiation circuitry 64 which outputs a control signal 90 to open and close the switches 84 depending on the value (e.g., a digital value, a voltage level, etc.).

It should be understood that only two transformers 76 are shown in FIG. 2 for simplicity, but that each network port 30 may have more than two transformers 76. For example, in the context of Ethernet, each port 30 includes four transformers 76. In this situation, the network circuitry 32 (omitted from FIG. 2 for simplicity) connects to the primary side of the isolation boundary while the Ethernet cabling 28 and remote devices 24 (FIG. 1) connect to the secondary side of the isolation boundary (i.e., the sides of the transformers 76 having the center taps 78).

During operation, the discovery/negotiation circuitry 64 performs discovery through the network port 30. If the discovery/negotiation circuitry 64 finds that a PD which is ready to receive inline power is connected to the network port 30, the discovery/negotiation circuitry 64 outputs the control signal 90 with the inline-power-ON value, i.e., the signal which effectuates closing of the switches 84. Accordingly, the switches 84 close thus providing closed pathways from the power source 62 to the transformers 76 for an inline power signal 92 (DC current), e.g., also see the inline power signal 40(1) in FIG. 1. As a result, the PSE 22 remotely powers the PD through the network port 30 (e.g., also see the remote device 24(1) connected to the network port 30(1) in FIG. 1).

However, during the discovery process, if the discovery/negotiation circuitry 64 determines that the inline power signal 92 should not be provided to the network port 30 (e.g., the remote device 24 is not a PoE device), the discovery/negotiation circuitry 64 outputs the control signal 90 with an inline-power-OFF value, i.e., a signal which effectuates opening of the switches 84. Accordingly, the switches 84 open thus cutting off the power source 62 from the terminals 80.

To summarize the operation of the control signal 90, the discovery/negotiation circuitry 64 provides the control signal 90 with an inline-power-ON value to close the switches 84 and thus turn on inline power to the network port 30. Additionally, the discovery/negotiation circuitry 64 provides the control signal 90 with an inline-power-OFF value which is different than the inline-power-ON value to open the switches 84 and thus turn off inline power to the network port 30.

While the PSE 22 is in operation, it should be understood that a situation could arise in which the PSE 22 inadvertently provides the inline power signal 92 to the network port 30. Regardless of whether a remote device 24 is connected to the network port 30, the detection circuitry 36 monitors the network port 30 for an inline power shutoff failure, and takes affirmative steps to protect against damaging any remote device 24 connected to the port 30 if such a failure is detected.

For example, suppose that the inline power circuitry 34 initially discovers a remote device 24 connected to the network port 30, and determines that the remote device 24 does not want inline power via the discovery process. In this situation, the discovery/negotiation circuitry 64 of the inline power circuitry 34 appropriately turns off inline power to the port 30 by outputting the control signal 92 with the inline-power-OFF value to the power control circuitry 66. At this point, the networking circuitry 32 exchanges data with the remote device 24 through the port 30, and the detection circuitry 36 monitors the port 30 for a possible inline power shutoff failure.

After the PSE 22 and the remote device 24 exchange data for some amount of time, further suppose that the switches 84 inadvertently fail thus enabling the inline power signal 92 (DC current) from the power source 62 to reach the terminals 80. Rather than allow the remote device 24 to be unknowingly exposed to the inline power signal 92 for a prolonged period of time and thus possibly damage the remote device 24, the detection circuitry 36 immediately detects the presence of the inline power signal 92 while the discovery/negotiation circuitry 64 of the inline power circuitry 34 outputs the control signal 92 with the inline-power-OFF value and, in response to such detection, takes affirmative steps to prevent damage to the remote device 24.

In particular, to detect the inline power shutoff failure, the sensing circuitry 70, which is electrically connected to the terminals 80, continuously monitors the electrical characteristics at the terminals 80 and provides a measurement signal 94 indicating the electrical status of the terminals 80. In some arrangements, the sensing circuitry 70 includes a comparator which compares the potential difference across the terminals 80(1), 80(2) to a predetermined voltage threshold, and the measurement signal 94 indicates whether the potential difference across the terminals 80(1), 80(2) is (i) greater than or equal to, or (ii) less than the predetermined voltage threshold. In other arrangements, the sensing circuitry 70 includes an analog-to-digital converter which outputs, as the measurement signal 94, a digital value indicating a measure potential difference across the terminals 80(1), 80(2). The predetermined threshold can, in some embodiments, be set via software or programming. Suitable voltage values include those which can potentially damage a remote device 24 (e.g., 1 Volt, 3 Volts, 5 Volts, and so on).

The notification circuit 72 obtains the measurement signal 94 from the sensing circuitry 70, and generates a result signal 96 based on the measurement signal 94. The result signal 96 indicates whether the power control circuitry 66 is applying the inline power signal 92 from the power source 62 to the terminals 80.

In some arrangements, the result signal 96 indicates whether the power control circuitry 66 is applying the inline power signal 92 regardless of the value of the control signal 90 from the discovery/negotiation circuitry 64. For example, the result signal 96 may be implemented as a power signal to light an LED adjacent the connector of the network port 30 (e.g., an RJ-45 jack). Accordingly, whenever the LED lights, a user knows that the inline power signal 92 is present at the network port 30.

In other arrangements, the notification circuitry 72 receives, on an input 98, the control signal 90 from the discovery/negotiation circuitry 64, and outputs the result signal 96 based on both the value of the measurement signal 94 and the value of the control signal 90. For example, the notification circuitry 72 may automatically send, as the result signal 96, an email message warning a user that the inline power signal 92 is present at the network port 30 only if the inline power signal 92 is present while the control signal 90 has the inline-power-OFF value since this is a sign that there has been an inline power shutoff failure. As another example, in the context of the PSE 22 being a high density switch or router with multiple line cards of network ports 30, the notification circuitry 72 may automatically output, as the result signal 96, an electronic command (or voltage level) which deactivates the line card on which the network port 30 resides when the control signal 90 has the inline-power-OFF value. As a result, the detection circuitry 36 effectively disables (or turns off) an entire circuit board (or module) once the detection circuitry 36 determines that there has been an inline power shutoff failure.

It should be understood that the detection circuitry 36 monitors the network port 30 for a possible inline power shutoff failure even when there is nothing connected to the port 30 (e.g., see the network port 30(3) in FIG. 1). That is, the discovery/negotiation circuitry 64 outputs the control signal 92 with the inline-power-OFF value to the power control circuitry 66 while there is no remote device 24 connected to the network port 30 (i.e., when standard IEEE 802.3af discovery determines that there is no device connected to the port 30). In this situation, if the power control circuitry 66 malfunctions and connects the power source 62 to the terminals 80, the detection circuitry 36 will nevertheless detect this inline power shutoff failure and take appropriate steps, e.g., inform the user that the network port 30 is "hot".

It should be further understood that the portion 60 of the PSE 22 is shown for only one network port 30 for simplicity, but that circuitry preferably exists within the PSE 22 to detect an inline power shutoff failure at each network port 30. To achieve protection for all network ports 30 it is not necessary to duplicate all components in FIG. 2 for each port 30. Rather, some circuitry can be centralized. For example, the notification circuit 72 may be implemented using a processor which is shared among multiple network ports 30. Accordingly, the PSE 22 is capable of effectively monitoring all of the network ports 30 for a shutoff failure regardless of whether there are devices connected to the ports 30. Further details will now be provided with reference to FIG. 3.

Figure 3:
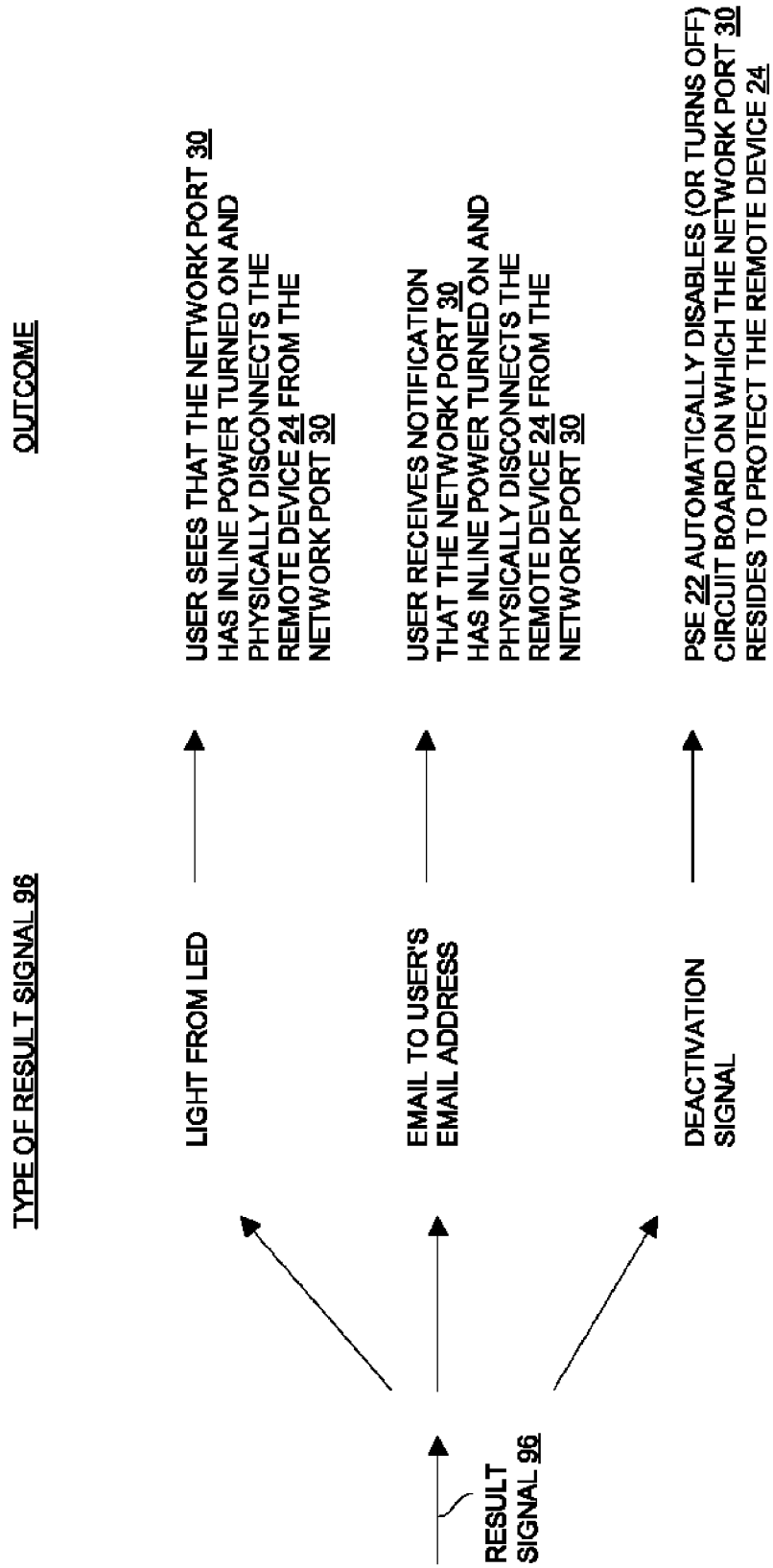
FIG. 3 is a block diagram of further details of the PSE of FIG. 1.

FIG. 3 is a block diagram illustrating (i) particular types of result signals 96 which are suitable for use in preventing damage to a remote device 24 which cannot handle inline power from the PSE 22, and (ii) the associated outcomes. It should be understood that some arrangements include more than one type of result signal 96 (e.g., combinations of different types).

In the context of an LED, the user is able to visually see whether a network port 30 currently has inline power turned on. Such an implementation is well suited for situations in which the user is prone to reside near the network ports 30 (e.g., a desktop router or switch in a small office environment, a patch panel or rack mount environment for a network administrator, etc.). As a result, the user is able to physically disconnect the remote device 24 (e.g., unplug the Ethernet cable 28) and then service/repair the PSE 22 on the spot.

In the context of an email, the user is able to obtain notification of the occurrence of an inline power shutoff failure remotely. Such an implementation is well suited for a user that is not stationed nearby the PSE 22 (e.g., when the PSE 22 resides in an equipment room or a location which is inconvenient for visual monitoring). Nevertheless, the user is able to go to the PSE 22 and physically disconnect the remote device 24 as well as service/repair the PSE 22.

In the context of a deactivation signal, the PSE 22 can automatically shut down a problematic circuit board or module as soon as the inline power shutoff failure is detected. Such an implementation is well suited for situations in which a user does not have regular, convenient or timely access to the PSE 22.

It should be understood that other types of result signals 96 are suitable for use as well. Such other types include audio signals, automated phone calls to a user or a service company, wireless signals, commands to shut down the remote device 24 or the entire PSE 22, write operations to non-volatile memory, log files, etc., inter-process communications, combinations thereof, and so on. Further details will now be provided with reference to FIG. 4.

Figure 4:
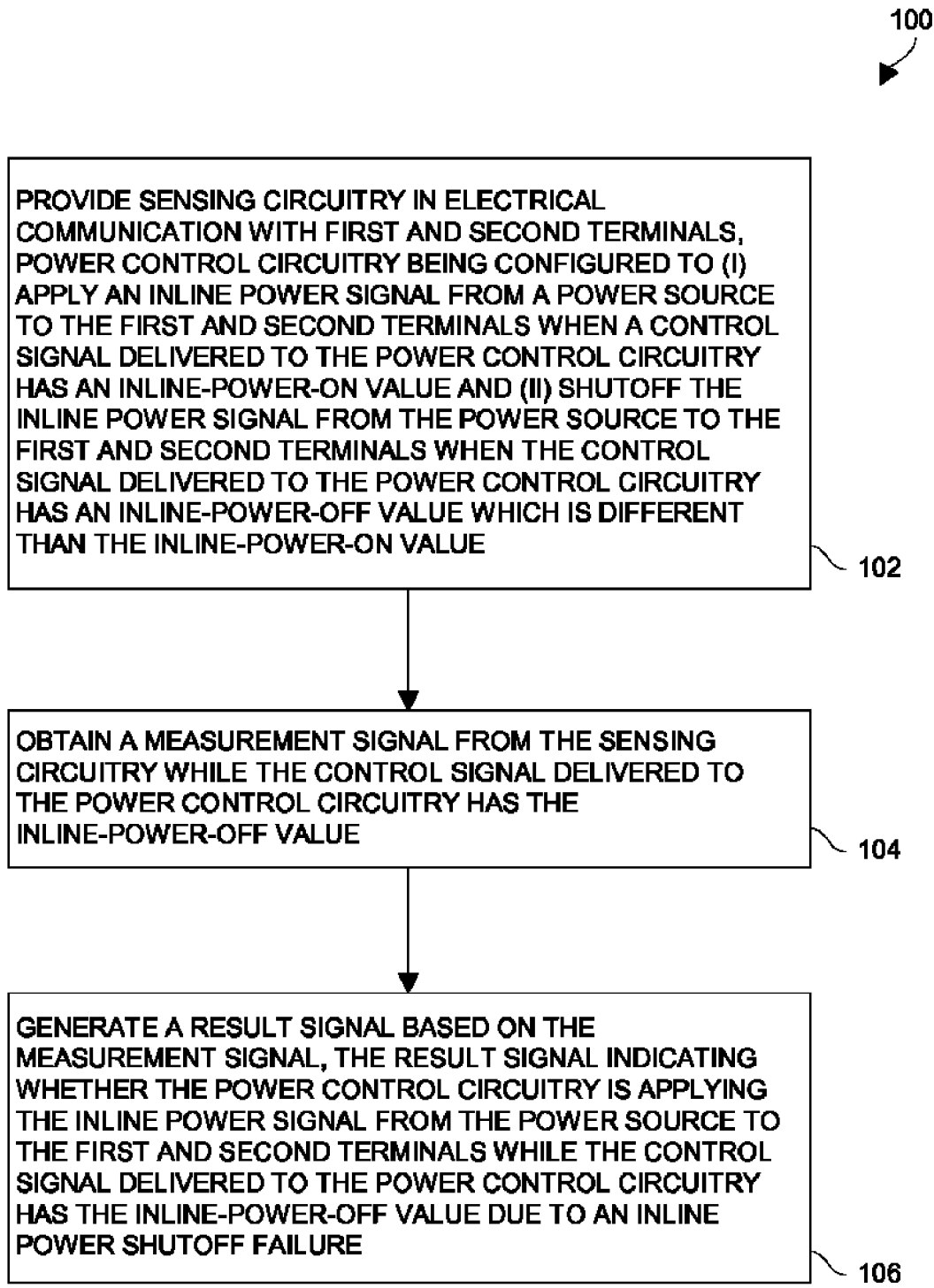
FIG. 4 is a flowchart of a procedure involving the electronic system of FIG. 1.

FIG. 4 is a flowchart of a procedure 100 which is performed by the detection circuitry 36 (also see FIGS. 1-3) when detecting and acting on an inline power shutoff failure. In step 102, the sensing circuitry 70 of the detection circuitry 36 (FIG. 2) electrically connects to the terminals 80 of the network port 30. Recall that the terminals 80 are essentially the center taps of the transformers 76 of the network port 30. Accordingly, there should be no DC voltage across the terminals if the inline power signal 92 is shut off from the terminals 80. However, at this point, the sensing circuitry 70 outputs a measurement signal 94 indicating that a DC voltage is present across the terminals 80 since an inline power shutoff failure has occurred.

In step 104, the notification circuit 72 of the detection circuitry 36 (FIG. 2) obtains the measurement signal 94 from the sensing circuitry 70 which indicates that the inline power signal 92 is present at the network port 30 even though the control signal 90 delivered to the power control circuitry 66 has the inline-power-OFF value.

In step 106, the notification circuit 72 generates a result signal 96 based on the measurement signal 94. In this situation, the result signal 96 indicates that the power control circuitry 66 is applying the inline power signal 92 from the power source 62 to the terminals 80 while the control signal 90 delivered to the power control circuitry 66 has the inline-power-OFF value due to an inline power shutoff failure (also see FIG. 3). Such operation prevents damage to remote devices 24 which cannot tolerate inline power by warning a user and/or automatically disabling a portion of the PSE 22 that provides the inline power signal 92 to the particular network port 30.

As described above, improved techniques involve detection of an inline power shutoff failure. Such detection involves monitoring network ports 30 when inline power is turned off to the network ports 30, e.g., monitoring network ports 30 at all times regardless of whether inline power is turned off or on. If the inline power signal 92 is detected at a network port 30 when inline power should be turned off, notification is capable of being provided to a user so that the user can take appropriate steps to disconnect any remote device 24 connected to the network port 30 and thus prevent damage to the remote device 24. Additionally, if the inline power signal 92 is detected at the network port 30 when inline power should be turned off, an automated safety operation is capable of being carried out (e.g., deactivation of a circuit board on which the network port 30 resides) to prevent damage to the remote device 24.

While various embodiments of the invention have been particularly shown and described, it will be understood by those skilled in the art that various changes in form and details may be made therein without departing from the spirit and scope of the invention as defined by the appended claims.

What is claimed is:

1. A detection circuit to detect an inline power shutoff failure in an electronic device having a power source, a first terminal, a second terminal, and power control circuitry which is disposed between (i) the power source and (ii) the first and second terminals, the power control circuitry being constructed and arranged to (i) apply an inline power signal from the power source to the first and second terminals when a control signal delivered to the power control circuitry has an inline-power-ON value and (ii) shutoff the inline power signal from the power source to the first and second terminals when the control signal delivered to the power control circuitry has an inline-power-OFF value which is different than the inline-power-ON value, the detection circuit comprising:

sensing circuitry constructed and arranged to electrically connect to the first and second terminals of the electronic device; and a notification circuit coupled to the sensing circuitry, the notification circuit being constructed and arranged to (i) obtain a measurement signal from the sensing circuitry while the control signal delivered to the power control circuitry has the inline-power-OFF value, and (ii) generate a result signal based on the measurement signal, the result signal indicating whether the power control circuitry is applying the inline power signal from the power source to the first and second terminals while the control signal delivered to the power control circuitry has the inline-power-OFF value due to an inline power shutoff failure.

2. A detection circuit as in claim 1 wherein the first terminal is a center tap of a first transformer of a particular network port of the electronic device;

wherein the second terminal is a center tap of a second transformer of the particular network port of the electronic device;

wherein the sensing circuitry includes an analog-to-digital (A/D) converter constructed and arranged to provide, as the measurement signal, a digital signal identifying an amount of potential difference detected across the center taps of the first and second transformers; and wherein the notification circuit, when generating the result signal based on the measurement signal, is constructed and arranged to output, as the result signal, notification to a user that the inline power shutoff failure has occurred.

3. An electronic device, comprising:

a power source;

a first terminal and a second terminal;

power control circuitry disposed between the power source and the first and second terminals, the power control circuitry being constructed and arranged to (i) apply an inline power signal from the power source to the first and second terminals when a control signal delivered to the power control circuitry has an inline-power-ON value and (ii) shutoff the inline power signal from the power source to the first and second terminals when the control signal delivered to the power control circuitry has an inline-power-OFF value which is different than the inline-power-ON value; and a detection circuit having:

sensing circuitry, and a notification circuit coupled to the sensing circuitry, the sensing circuitry being in electrical communication with the first and second terminals, the notification circuit being constructed and arranged to (i) obtain a measurement signal from the sensing circuitry while the control signal delivered to the power control circuitry has the inline-power-OFF value, and (ii) generate a result signal based on the measurement signal, the result signal indicating whether the power control circuitry is applying the inline power signal from the power source to the first and second terminals while the control signal delivered to the power control circuitry has the inline-power-OFF value due to an inline power shutoff failure.

4. An electronic device as in claim 3 wherein the electronic device is power sourcing equipment (PSE) having multiple network ports to exchange data with and concurrently deliver inline power to multiple powered devices (PDs);

wherein the first terminal is a center tap of a first transformer of a particular network port of the PSE;

wherein the second terminal is a center tap of a second transformer of the particular network port of the PSE; and wherein the power control circuitry is constructed and arranged to apply the inline power signal from the power source to the first and second terminals to provide inline power from the power source to a particular PD through the center taps of the first and second transformers of the particular network port of the PSE while the control signal delivered to the power control circuitry has the inline-power-ON value.

5. An electronic device as in claim 4 further comprising:
networking circuitry coupled to the first and second transformers of the particular network port; and
wherein the power control circuitry, when applying the inline power signal from the power source to the first and second terminals to provide inline power from the power source to the particular PD, is constructed and arranged to supply the inline power signal from the power source to the particular PD through the center taps of the first and second transformers of the particular network port while the networking circuitry concurrently exchanges data with the particular PD through the first and second transformers of the particular network port.

6. An electronic device as in claim 5 wherein the sensing circuitry includes an analog-to-digital (A/D) converter constructed and arranged to provide, as the measurement signal, a digital signal identifying an amount of potential difference detected across the center taps of the first and second transformers; and
wherein the notification circuit, when obtaining the measurement signal from the sensing circuitry while the control signal delivered to the power control circuitry has the inline-power-OFF value, is constructed and arranged to input, as the measurement signal, a digital input signal from the A/D converter into a notification circuit, the digital input signal identifying an amount of potential difference detected across the center taps of the first and second transformers while the control signal delivered to the power control circuitry has the inline-power-OFF value.

7. An electronic device as in claim 6 wherein the notification circuit includes a light emitting diode (LED) component which is activated when the digital input signal from the A/D converter indicates that the potential difference across the center taps of the first and second transformers exceeds a predetermined threshold; and
wherein the LED component, when activated, warns a user that the inline power signal is being applied from the power source to the first and second terminals.

8. An electronic device as in claim 6 wherein the notification circuit includes processing circuitry which is constructed and arranged to send an email message to a user in response to (i) the result signal indicating that the potential difference across the center taps of the first and second transformers exceeds a predetermined threshold, and (ii) the control signal delivered to the power control circuitry having the inline-power-OFF value, to warn the user that the inline power signal is being applied from the power source to the first and second terminals while the control signal delivered to the power control circuitry has the inline-power-OFF value.

9. An electronic device as in claim 6 wherein the notification circuit includes processing circuitry disposed on a first circuit board;
wherein the first transformer and the second transformer reside on a second circuit board which is different than the first circuit board; and
wherein the notification circuit is constructed and arranged to output, as the result signal, a disable signal which disables operation of the second circuit board.

10. An electronic device as in claim 3 wherein the electronic device is power sourcing equipment (PSE) having (i) networking circuitry and (ii) multiple network ports to exchange data with and concurrently deliver inline power to multiple powered devices (PDs);
wherein the first terminal is a center tap of a first transformer of a particular network port of the PSE;
wherein the second terminal is a center tap of a second transformer of the particular network port of the PSE; and
wherein the networking circuitry is constructed and arranged to exchange data with a remote device through the first and second transformers of the particular network port while (i) the control signal delivered to the power control circuitry has the inline-power-OFF value and (ii) the remote device receives power from a source local to the remote device.

11. An electronic device as in claim 10 wherein the notification circuit, when obtaining the measurement signal from the sensing circuitry while the control signal delivered to the power control circuitry has the inline-power-OFF value, is constructed and arranged to:
acquire the measurement signal from the sensing circuitry while data is exchanged data between the networking circuitry of the PSE and the remote device through the first and second transformers of the particular network port.

12. In an electronic device having a power source, a first terminal, a second terminal, and power control circuitry which is disposed between (i) the power source and (ii) the first and second terminals, a method to detect an inline power shutoff failure, the method comprising:
providing sensing circuitry in electrical communication with the first and second terminals, the power control circuitry being constructed and arranged to (i) apply an inline power signal from the power source to the first and second terminals when a control signal delivered to the power control circuitry has an inline-power-ON value and (ii) shutoff the inline power signal from the power source to the first and second terminals when the control signal delivered to the power control circuitry has an inline-power-OFF value which is different than the inline-power-ON value;
obtaining a measurement signal from the sensing circuitry while the control signal delivered to the power control circuitry has the inline-power-OFF value; and
generating a result signal based on the measurement signal, the result signal indicating whether the power control circuitry is applying the inline power signal from the power source to the first and second terminals while the control signal delivered to the power control circuitry has the inline-power-OFF value due to an inline power shutoff failure.

13. A method as in claim 12 wherein the electronic device is power sourcing equipment (PSE) having multiple network ports to exchange data with and concurrently deliver inline power to multiple powered devices (PDs); wherein the first terminal is a center tap of a first transformer of a particular network port of the PSE; wherein the second terminal is a center tap of a second transformer of the particular network port of the PSE; and wherein the method further comprises:
while the control signal delivered to the power control circuitry has the inline-power-ON value, applying the inline power signal from the power source to the first and second terminals to provide inline power from the power source to a particular PD through the center taps of the first and second transformers of the particular network port of the PSE.

14. A method as in claim 13 wherein applying the inline power signal from the power source to the first and second terminals to provide inline power from the power source to the particular PD includes:

supplying the inline power signal from the power source to the particular PD through the center taps of the first and second transformers of the particular network port while networking circuitry of the PSE concurrently exchanges data with the particular PD through the first and second transformers of the particular network port.

15. A method as in claim 14 wherein the sensing circuitry includes an analog-to-digital (A/D) converter; and wherein obtaining the measurement signal from the sensing circuitry while the control signal delivered to the power control circuitry has the inline-power-OFF value includes:
inputting, as the measurement signal, a digital input signal from the A/D converter into a notification circuit, the digital input signal identifying an amount of potential difference detected across the center taps of the first and second transformers while the control signal delivered to the power control circuitry has the inline-power-OFF value.

16. A method as in claim 15 wherein the notification circuit includes a light emitting diode (LED) component;
wherein generating the result signal based on the measurement signal includes controlling the LED component based on the digital input signal from the A/D converter, wherein the LED component being activated when the digital input signal from the A/D converter indicates that the potential difference across the center taps of the first and second transformers exceeds a predetermined threshold; and
wherein the LED component, when activated, warns a user that the inline power signal is being applied from the power source to the first and second terminals.

17. A method as in claim 15 wherein the notification circuit includes processing circuitry;
wherein generating the result signal based on the measurement signal includes sending an email message from the processing circuitry to a user in response to (i) the result signal indicating that the potential difference across the center taps of the first and second transformers exceeds a predetermined threshold, and (ii) the control signal delivered to the power control circuitry having the inline-power-OFF value, to warn the user that the inline power signal is being applied from the power source to the first and second terminals while the control signal delivered to the power control circuitry has the inline-power-OFF value.

18. A method as in claim 15 wherein the notification circuit includes processing circuitry disposed on a first circuit board;
wherein the first transformer and the second transformer reside on a second circuit board which is different than the first circuit board; and
wherein generating the result signal based on the measurement signal includes outputting, from the processing circuitry to the second circuit board, a disable signal which disables operation of the second circuit board.

19. A method as in claim 12 wherein the electronic device is power sourcing equipment (PSE) having multiple network ports to exchange data with and concurrently deliver inline power to multiple powered devices (PDs); wherein the first terminal is a center tap of a first transformer of a particular network port of the PSE; wherein the second terminal is a center tap of a second transformer of the particular network port of the PSE; and wherein the method further comprises:
exchanging data between networking circuitry of the PSE and a remote device through the first and second transformers of the particular network port while (i) the control signal delivered to the power control circuitry has the inline-power-OFF value and (ii) the remote device receives power from a source local to the remote device.

20. A method as in claim 19 wherein obtaining the measurement signal from the sensing circuitry while the control signal delivered to the power control circuitry has the inline-power-OFF value includes:
acquiring the measurement signal from the sensing circuitry while data is exchanged data between the networking circuitry of the PSE and the remote device through the first and second transformers of the particular network port.

* * * * *